United States Patent [19]
Wada et al.

[11] Patent Number: 5,132,800
[45] Date of Patent: Jul. 21, 1992

[54] VIDEO CAMERA WITH AN ACCESSORY ADAPTER REMOVABLY INTERPOSED BETWEEN A BATTERY PACKAGE AND A BATTERY MOUNT ON THE CAMERA BODY

[75] Inventors: Koichi Wada, Tokyo; Takanori Maruichi, Chiba, both of Japan

[73] Assignee: Sony Corporation, Tokyo, Japan

[21] Appl. No.: 674,976

[22] Filed: Mar. 26, 1991

[30] Foreign Application Priority Data

Mar. 29, 1990 [JP] Japan .................................. 2-82241

[51] Int. Cl.$^5$ ........................ H04N 5/30; H04N 5/225
[52] U.S. Cl. .................................. 358/209; 358/229; 358/909; 358/906; 354/295; 354/288; 354/484
[58] Field of Search ............... 358/209, 909, 906, 229; 354/295, 484, 288, 75, 76; 352/243

[56] References Cited

U.S. PATENT DOCUMENTS

| | | | |
|---|---|---|---|
| 4,499,504 | 2/1985 | Edakubo | 358/209 |
| 4,507,689 | 3/1985 | Kozuki | 358/906 |
| 4,924,246 | 5/1990 | Yamada | 358/906 |
| 5,049,917 | 9/1991 | Yasukawa | 354/484 |
| 5,068,683 | 11/1991 | Miyazaki | 358/906 |
| 5,075,706 | 12/1991 | Miyazaki | 358/906 |

FOREIGN PATENT DOCUMENTS 0400944 12/1990 European Pat. Off. .
0159578  7/1987 Japan .

Primary Examiner—Howard W. Britton
Assistant Examiner—Sherrie Hsia
Attorney, Agent, or Firm—Alvin Sinderbrand; William S. Frommer

[57] ABSTRACT

A compact, battery-powered video camera comprises a camera body provided with a built-in VTR deck, a viewfinder and a built-in microphone, a first battery mount formed integrally with the camera body, an accessory adapter provided at least with video/audio output terminals and capable of being detachably joined to the first battery mount, a second battery mount formed integrally with the accessory adapter, and a battery package capable of being detachably joined to the second battery mount. When the video camera is used only for recording pictures, the accessory adapter is removed from the camera body, and the battery package is joined directly to the first battery mount to reduce the size and weight of the video camera. In reproducing recorded pictures, the accessory adapter is joined to the first battery mount, the battery package is joined to the second battery mount, and the video camera is connected electrically through the accessory adapter to a television receiver.

5 Claims, 5 Drawing Sheets

VIDEO CAMERA WITH AN ACCESSORY ADAPTER REMOVABLY INTERPOSED BETWEEN A BATTERY PACKAGE AND A BATTERY MOUNT ON THE CAMERA BODY

BACKGROUND OF THE INVENTION

1. Field of the Invention

The present invention relates to a battery-powered video camera of a compact construction having a detachable accessory adapter provided at least with audio/video output terminals, and a detachable battery package as a power supply.

2. Description of the Prior Art

The applicant of the present patent application proposed previously a compact 8 mm video camera in Japanese Patent Application No. 1-136356. As shown in FIG. 5, this video camera 1 has a camera body 2, a grip 3 attached to one side of the camera body 2, and a viewfinder 5 attached to the other side of the camera body 2. The camera body 2 contains a built-in VTR deck 4 on the side of the grip 3, a built-in microphone 6 in the upper portion of the front side, and a built-in connector unit 30 in the lower portion of the front side. The connector unit 30 is provided with only two terminals, a video I/O terminal 30a and an audio I/O terminal 30b, to form the connector unit 30 in a comparatively small size. The circuit of the video camera 1 is switched to use the video I/O terminal 30a and the audio I/O terminal 30b as a video input terminal and an audio input terminal or as a video output terminal and an audio output terminal. The video camera 1 is connected through the connector unit 30 to a television receiver in reproducing recorded video and audio signals. The connector unit 30 is unnecessary when the video camera 1 is used only for recording pictures. Omission of the connector unit 30 will enable the further reduction of the size of the video camera 1.

SUMMARY OF THE INVENTION

Accordingly, it is an object of the present invention to provide a compact video camera of a further reduced size as compared with that of a conventional compact video camera.

In one aspect of the present invention, a video camera comprises a camera body provided with a battery mount on which batteries can be detachably mounted, and an accessory adapter provided at least with a video output terminal and an audio output terminal, capable of detachably holding batteries, and capable of being detachably mounted on the battery mount of the camera body.

Omission of a terminal unit from the camera body enables the further reduction of the size of the camera body. When the video camera is used for recording pictures, the accessory adapter may be removed from the camera body and the batteries are mounted on the battery mount of the camera body, which reduces the weight of the video camera and facilitates recording pictures outdoors.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Figure 1:
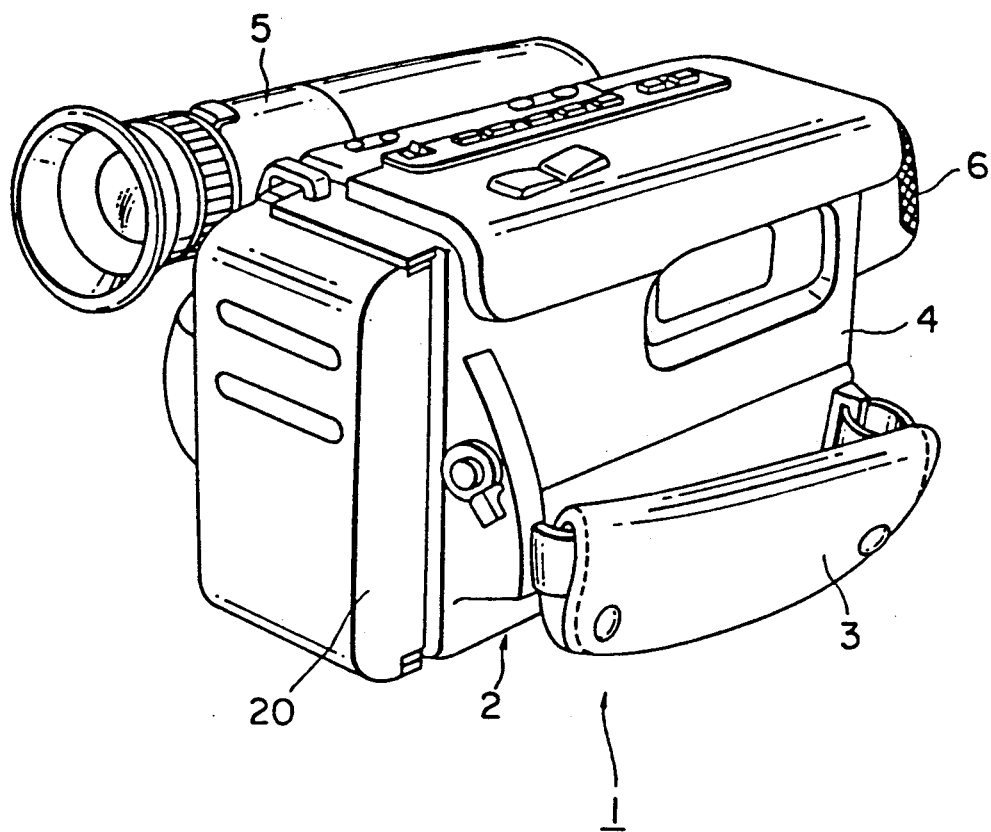
FIG. 1 is a perspective view of a video camera in a preferred embodiment according to the present invention.
Figure 2:
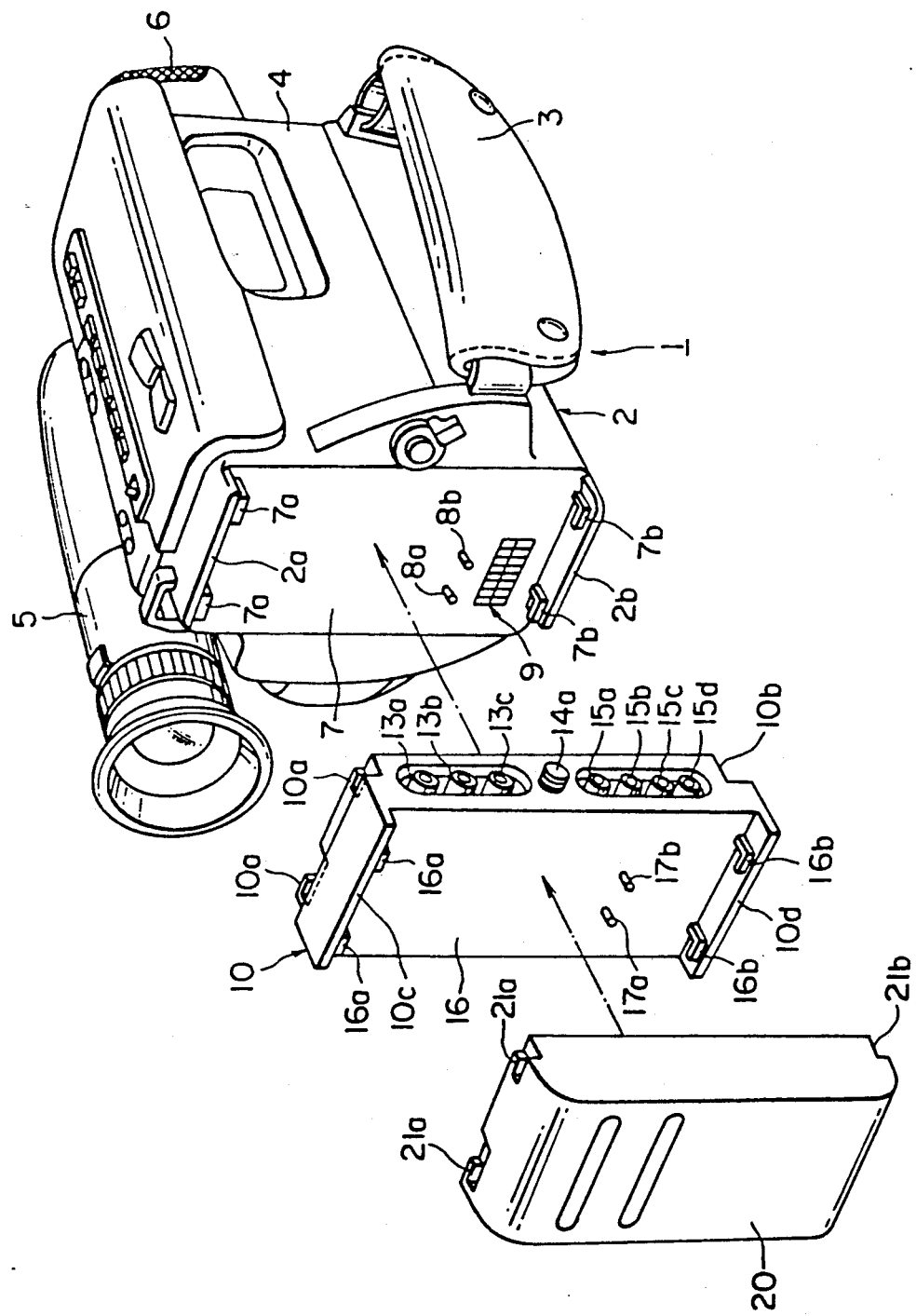
FIG. 2 is an exploded perspective view of the video camera of FIG. 1.
Figure 3:
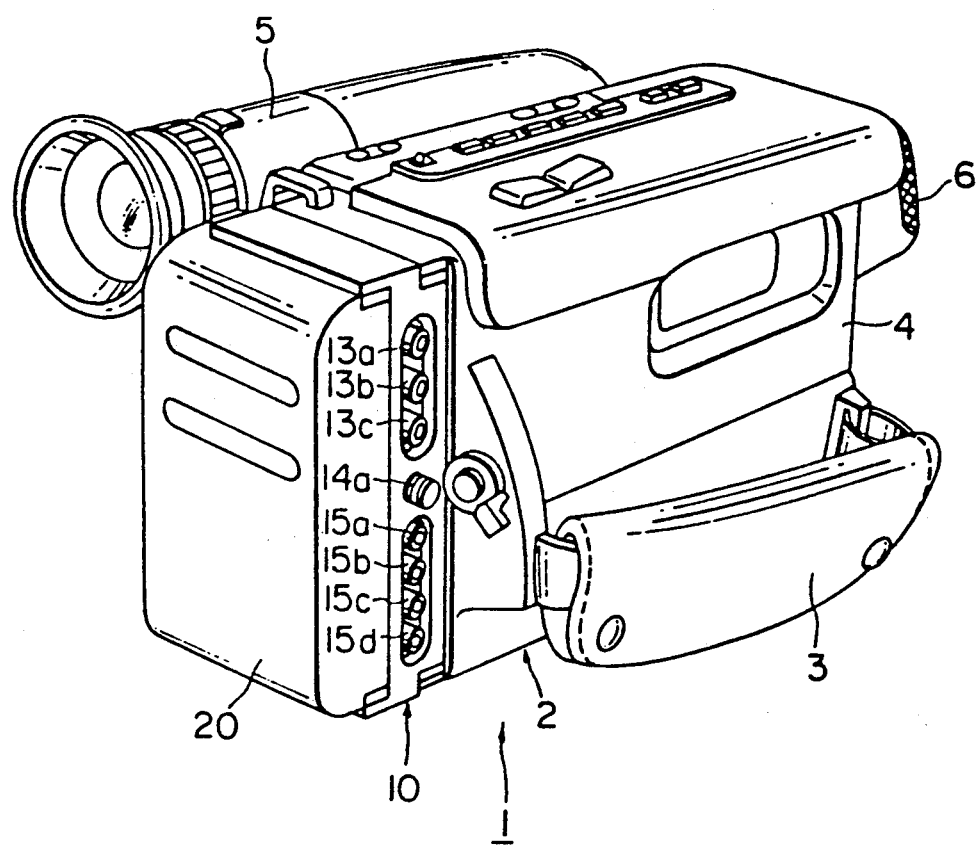
FIG. 3 is a perspective view of the video camera of FIG. 1 in a full assembly.

The present invention will be described hereinafter as applied to an 8 mm video camera. Referring to FIGS. 1 to 3, a video camera 1 comprises a camera body 2, a grip 3 attached to one side of the camera body 2, a VTR deck 4 provided in the camera body 2 on the side of the grip 3, a viewfinder 5 attached to the other side of the camera body 2, a microphone 6 provided in the upper portion of the front side of the camera body 2, a first battery mount 7 formed on the back side of the camera body 2, an accessory adapter 10 having a second battery mount 16 and capable of being joined to the battery mount 7, and a battery package 20.

The first battery mount 7 comprises a pair of flanges 2a and 2b formed integrally with the back wall of the camera body 2 opposite to each other and provided on their inner surfaces with a pair of L-shaped upper latching projections 7a and a pair of L-shaped lower latching projections 7b, respectively, a positive terminal pin 8a projecting from the back wall of the camera body 2, a negative terminal pin 8b projecting from the back wall of the camera body 2, and an electric connector 9 embedded in the lower portion of the back wall of the camera body 2.

As shown in FIGS. 2 and 3, the accessory adapter 10 can detachably be joined to the battery mount 7. A pair of L-shaped upper recesses 10a capable of engaging the pair of latching projections 7a, and a pair of L-shaped lower recesses 10b capable of engaging the pair of latching projections 7b are formed near the upper corners and near the lower corners, respectively, of the front surface of the accessory adapter 10. A pair of conductive spring plates 11a and 11b are provided on the front surface of the accessory adapter 10 so as to correspond respectively to the positive terminal pin 8a and the negative terminal pin 8b.

An L-channel audio input plug 12a, an R-channel audio input plug 12b, a video input plug 12c, an L-channel audio output plug 12d, an R-channel audio output plug 12e, a monaural audio output plug 12f and a video output plug 12g (FIG. 4) arranged on the front surface of the accessory adapter 10 are connected to an L-channel audio input terminal 9a, an R-channel audio input terminal 9b, a video input terminal 9c, an L-channel audio output terminal 9d, an R-channel audio output terminal 9e, a monaural audio output terminal 9f and a video output terminal 9g (FIG. 4), respectively, provided in the electric connector 9 when the accessory adapter 10 is joined to the first battery mount 7. The accessory adapter 10 can readily be joined to or removed from the first battery mount 7 by making the pair of latching projections 7a and the pair of latching projections 7b engage the pair of upper recesses 10a and the pair of lower recesses 10b, respectively, or disengaging the pair of latching projections 7a and the pair of latching projections 7b from the pair of upper recesses 10a and the pair of lower recesses 10b, respectively. When the accessory adapter 10 is joined to the first battery mount 7 of the camera body 2, the pair of conductive spring plates 11a and 11b are in contact respectively with the positive terminal pin 8a and the negative terminal pin 8b of the battery mount 7.

Figure 4:
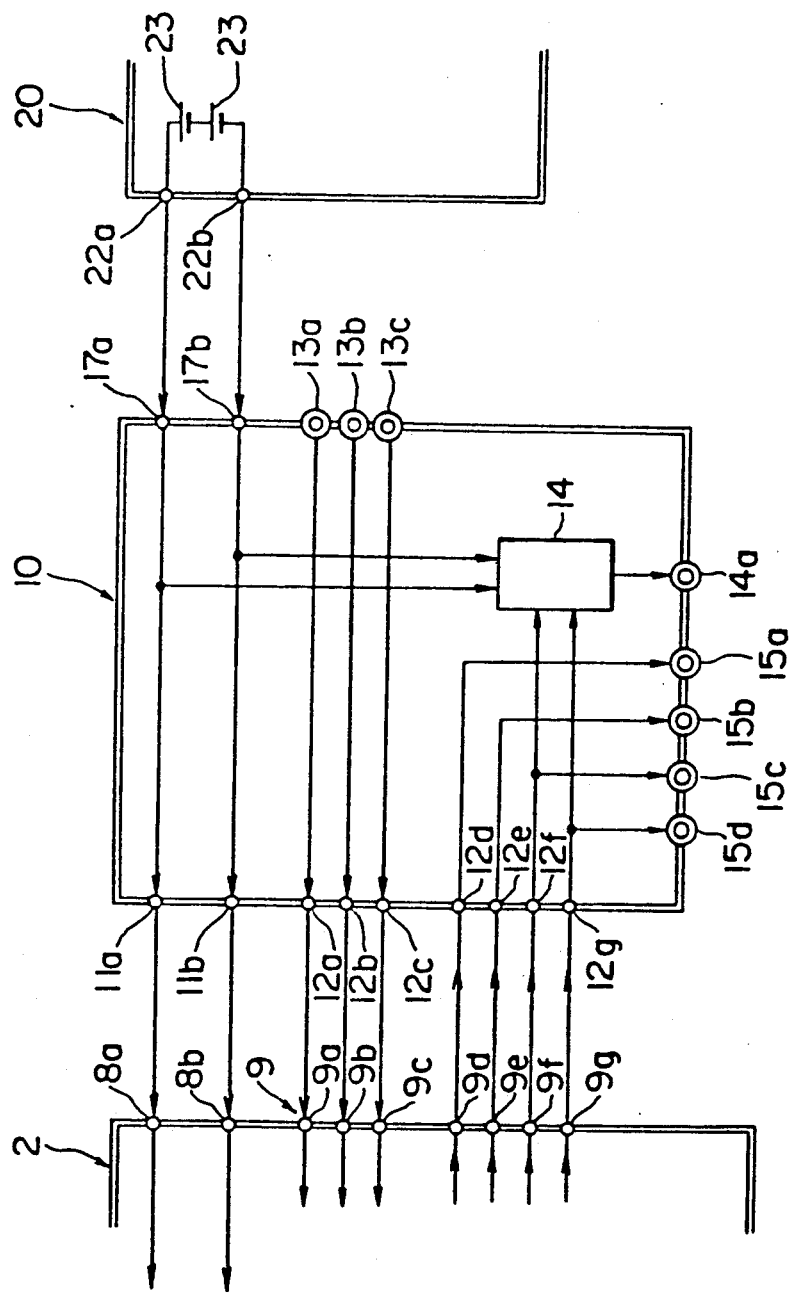
FIG. 4 is a block diagram of an electric circuit incorporated into the video camera of FIG. 1.
Figure 5:
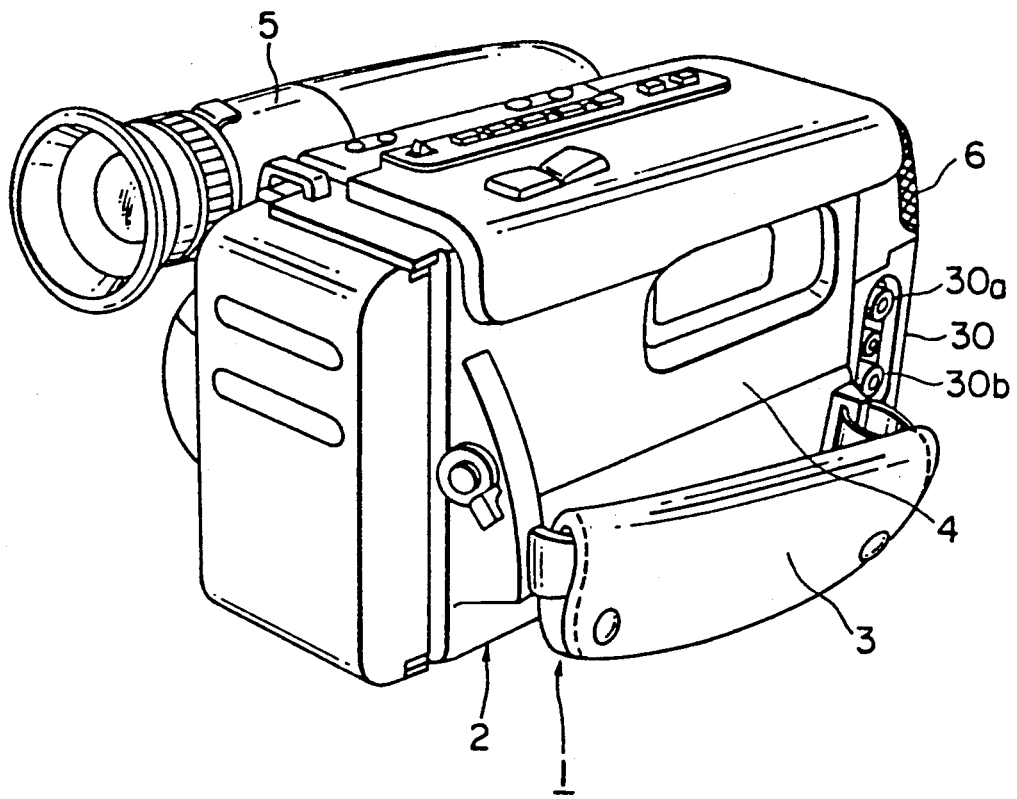
FIG. 5 is a perspective view of a conventional video camera.

As shown in FIGS. 2 and 3, the accessory adapter 10 is provided on one side surface thereof with an L-channel audio input terminal 13a, an R-channel audio input terminal 13b, a video input terminal 13c, a RF output terminal 14a connected to an RFU 14 (shown on FIG. 4 and which is (a circuit for converting video signals into antenna input signals in reproducing the video signals by a television receiver provided only with an antenna terminal), an L-channel audio output terminal 15a, an R-channel audio output terminal 15b, a monaural audio output terminal 15c and a video output terminal 15d, which are arranged vertically in that order.

The second battery mount 16 is formed on the back side of the accessory adapter 10. The configuration of the second battery mount 16 is identical with that of the first battery mount 7. The second battery mount 16 is provided with a pair of flanges 10c and 10d provided on the their inner surfaces respectively with a pair of L-shaped latching projections 16a and a pair of L-shaped latching projections 16b, and formed respectively in the upper and lower ends of the back wall of the camera body 2 opposite to each other, a positive terminal pin 17a and a negative terminal pin 17b projecting from the back surface of the camera body 2. The battery package 20 can detachably joined to the second battery mount 16 of the accessory adapter 10. A pair of L-shaped upper recesses 21a and a pair of L-shaped lower recesses 21b are formed respectively in the upper corners and the lower corners of the battery package 20 at positions respectively corresponding to the latching projections 16a and 16b of the accessory adapter 10. A pair of conductive spring plates 22a and 22b are provided on the front surface of the battery package 20 so as to correspond respectively to the positive terminal pin 17a and the negative terminal pin 17b. The battery package 20 can readily be joined to or removed from the second battery mount 16 of the accessory adapter 10 by making the pair of latching projections 16a and the pair of latching projections 16b engage the upper recesses 21a and the lower recesses 21b, respectively, or disengaging the pair of latching projections 16a and the pair of latching projections 16b respectively from the upper recesses 21a and the lower recesses 21b. When the battery package 20 is joined to the second battery mount 16 of the accessory adapter 10, the positive terminal pin 17a and the negative terminal pin 17b are in contact respectively with the pair of conductive spring plates 22a and 22b to supply power to the camera body 2 and the accessory adapter 10. When the video camera 1 does not need the accessory adapter 10, the accessory adapter 10 is removed from the camera body 2 and the battery package 20 is joined directly to the first battery mount 7 of the camera body 2. The battery package 20 may be a battery case containing a plurality of dry cells 23 or may be a secondary battery pack.

Thus, when the video camera 1 is used only for recording pictures, the accessory adapter 10 is removed from the camera body 2, and the battery package 20 is joined directly to the camera body 2 as shown in FIG. 1 to reduce the size and weight of the video camera 1, which facilitates the operation of the video camera 1.

In reproducing recorded pictures, the accessory adapter 10 is joined to the first battery mount 7 of the camera body 2, and the battery package 20 for supplying dc power or an ac adapter for supplying ac power is joined to the second battery mount 16 of the accessory adapter 10, and the video output terminal 15d and the audio output terminal 15c of the accessory adapter are connected to the audio input terminal and the audio input terminal of a television receiver with an AV cable. If the television receiver is not provided with the video and audio input terminals and is provided only with an antenna terminal, the RF output terminal 14a of the accessory adapter 10 is connected to the antenna terminal of the television receiver with a cable to reproduce the recorded pictures. Since the accessory adapter 10 is provided with the RF output terminal 14a, the video camera 1 can be connected to the antenna terminal of the television receiver without using an RFU adapter, which is necessary for connecting the conventional video camera to the antenna terminal of a television receiver.

The video camera 1 assembled by joining the accessory adapter 10 to the first battery mount of the camera body 2, and joining the battery package 20 to the second battery mount of the accessory adapter 10 can be used outdoors where ac power is unavailable as well as indoors for recording pictures and for reproducing recorded pictures. The accessory adapter 10 held between the camera body 2 and the battery package 20 as shown in FIG. 3 does not spoil the appearance of the video camera 1.

Although the present invention has been described as applied to an 8 mm video camera, the present invention is not limited thereto in its practical application and may be applied to like equipments.

As many widely different embodiments of the present invention may be made without departing from the scope and spirit thereof, it is to be understood that the present invention is not limited to the specific embodiment herein disclosed except as defined in the appended claims.

What is claimed is:

1. A video camera comprising:
   a camera body having a back wall;
   first battery mounting means formed integrally with said back wall of the camera body;
   an accessory adapter having opposing walls and a peripheral surface therebetween, at least video and audio output terminals extending from said peripheral surface, means at one of said opposing walls capable of being detachably joined to the first battery mounting means, and electrical coupling means at said one of the opposing walls of the accessory adapter and at said back wall of the camera body for establishing electrical communication with said video and audio output terminals when said means at said wall are joined to said first battery mounting means;
   second battery mounting means identical in configuration with said first battery mounting means and being formed integrally with the other of said opposing walls of the accessory adapter; and
   a battery package having means thereon detachably engageable with either said first battery mounting means or said second battery mounting means.

2. A video camera according to claim 1, wherein said camera body has a built-in VTR deck, a viewfinder and a built-in microphone.

3. A video camera according to claim 1, wherein said electrical coupling means includes an electric connector on said back wall of the camera body having an L-channel audio input terminal, an R-channel audio input terminal, a video input terminal, an L-channel audio output terminal, an R-channel audio output terminal, a monaural audio output terminal and a video output terminal, and, on said one wall of the accessory adapter, an L-channel audio input plug, an R-channel audio input plug, a video input plug, an L-channel audio output plug, an R-channel audio output plug, a monaural audio output plug and a video output plug, which are connected respectively to the L-channel audio input terminal, R-channel audio input terminal, video input terminal, L-channel audio output terminal, R-channel audio output terminal, monaural output terminal and video output terminal of the electric connector when the accessory adapter is joined to said first battery mounting means.

4. A video camera according to claim 3, wherein said peripheral surface of said accessory adapter also has an L-channel audio input terminal, an R-channel audio input terminal, a video input terminal and a RF output terminal extending therefrom.

5. A video camera according to claim 1; wherein said peripheral surface of said accessory adapter also has an L-channel audio input terminal, an R-channel audio input terminal, a video input terminal and a RF output terminal.

* * * * *